(12) United States Patent
Choi et al.

(10) Patent No.: US 7,916,141 B2
(45) Date of Patent: Mar. 29, 2011

(54) IMAGE PROCESSING SYSTEM USING VECTOR PIXEL

(76) Inventors: Kum-Young Choi, Seoul (KR); Wha Rim, Seoul (KR); Jung-Hwan Cho, Gunpo-si (KR)

( * ) Notice: Subject to any disclaimer, the term of this patent is extended or adjusted under 35 U.S.C. 154(b) by 941 days.

(21) Appl. No.: 11/697,465

(22) Filed: Apr. 6, 2007

(65) Prior Publication Data

US 2007/0236500 A1    Oct. 11, 2007

(30) Foreign Application Priority Data

Apr. 10, 2006 (KR) .......... 10-2006-0032274
Sep. 25, 2006 (KR) .......... 10-2006-0092801

(51) Int. Cl.
*G06T 11/20*    (2006.01)
*G06T 11/60*    (2006.01)

(52) U.S. Cl. ................................ 345/441

(58) Field of Classification Search ............ 345/441
See application file for complete search history.

(56) References Cited

U.S. PATENT DOCUMENTS

| | | | |
|---|---|---|---|
| 4,777,651 A * | 10/1988 | McCann et al. | 382/242 |
| 5,511,153 A * | 4/1996 | Azarbayejani et al. | 345/419 |
| 6,111,979 A * | 8/2000 | Katto | 382/154 |
| 6,584,155 B2 * | 6/2003 | Takeda et al. | 375/240.16 |
| 6,816,621 B1 * | 11/2004 | Handley | 382/260 |
| 6,904,179 B2 * | 6/2005 | Handley | 382/260 |
| 6,912,317 B1 * | 6/2005 | Barnes et al. | 382/239 |
| 7,251,376 B2 * | 7/2007 | Qian et al. | 382/253 |
| 7,389,317 B2 * | 6/2008 | Guttag et al. | 708/620 |
| 7,444,026 B2 * | 10/2008 | Fujimoto | 382/236 |
| 7,548,659 B2 * | 6/2009 | Ofek et al. | 382/254 |

(Continued)

OTHER PUBLICATIONS

Performance of optical flow techniques Barron, J.L.; Fleet, D.J.; Beauchemin, S.S.; Burkitt, T.A.; Computer Vision and Pattern Recognition, 1992. Proceedings CVPR '92., 1992 IEEE Computer Society Conference on Jun. 15-18, 1992 pp. 236-242.*

(Continued)

*Primary Examiner* — Javid A Amini

(74) *Attorney, Agent, or Firm* — Jefferson IP Law, LLP

(57) ABSTRACT

An image processing system using vector pixel is disclosed. The system includes a vector pixel with 1 byte, a data unit structure, a data portion, a file generation unit, and a data processing unit. The vector pixel with 1 byte is configured such that, in the low 4 bits, a vector information portion is positioned, and information of one of 8 vectors, up, down, left, right, up-left, up-right, bottom-left, and bottom-right vectors, with respect to X- and Y-axis, is stored. The data unit structure forms a partial image by combining the vector pixel, and has a boundary indicator for indicating the boundary of the partial image at the end of the data unit structure. The data portion forms a complete image by combining the data unit, and has a terminator for indicating the termination of the complete image at the end of the data portion. The file generation unit forms the data portion according to a specific command, and generates/stores a computer image file based on the data portion. The data processing unit processes direction indication according to vector information of the image file generated by the file generation unit and forms an image based on the direction indication process. The system can reduce the size of image data to be stored in a computer's storage memory, such as the main memory and a storage disk, image processing speed can be enhanced and data communication time can be shortened.

9 Claims, 11 Drawing Sheets

U.S. PATENT DOCUMENTS

| | | | |
|---|---|---|---|
| 2003/0105793 A1* | 6/2003 | Guttag et al. | 708/625 |
| 2004/0095999 A1* | 5/2004 | Piehl et al. | 375/240.16 |
| 2004/0105589 A1* | 6/2004 | Kawaharada et al. | 382/236 |
| 2004/0184542 A1* | 9/2004 | Fujimoto | 375/240.16 |
| 2005/0013498 A1* | 1/2005 | Srinivasan et al. | 382/239 |
| 2005/0047670 A1* | 3/2005 | Qian et al. | 382/253 |
| 2008/0123945 A1* | 5/2008 | Andrew et al. | 382/164 |
| 2008/0130967 A1* | 6/2008 | Wang et al. | 382/128 |
| 2008/0247462 A1* | 10/2008 | Demos | 375/240.03 |
| 2009/0167959 A1* | 7/2009 | Nakamura et al. | 348/699 |

OTHER PUBLICATIONS

Accelerated MPEG compression of dynamic polygonal scenes Dan S. Wallach, Sharma Kunapalli, Michael F. Cohen Jul. 1994 SIGGRAPH '94: Proceedings of the 21st annual conference on Computer graphics and interactive techniques Publisher: ACM.*

Level-of-detail representation of bidirectional texture functions for real-time rendering Wan-Chun Ma, Sung-Hsiang Chao, Yu-Ting Tseng, Yung-Yu Chuang, Chun-Fa Chang, Bing-Yu Chen, Ming Ouhyoung pril 2005 I3D '05: Proceedings of the 2005 symposium on Interactive 3D graphics and games Publisher: ACM.*

A parallel vector quantization processor featuring an efficient search algorithm for real-time motion picture compression Toshiyuki Nozawa, Makoto Imai, Masanori Fujibayashi, Tadahiro Ohmi Jan. 2001 ASP-DAC '01: Proceedings of the 2001 Asia and South Pacific Design Automation Conference Publisher: ACM.*

Subband image segmentation using VQ for content-based image retrieval Junchul Chun, George Stockman Oct. 2001 Multimedia '01: Proceedings of the ninth ACM international conference on Multimedia Publisher: ACM.*

* cited by examiner (A) basic header

| Name | Size (byte) | Description | |
|---|---|---|---|
| Control | 1 | Types of all files are described | |
| | | 0xf2 | Read all data based on 4 bytes of vexel value |
| | | 0xf4 | Have a header whose format is GrimHeader |
| | | 0xf5 | Have a header whose format is GrimHeaderEx |
| | | 0xf6 | Operate high vector (ignore if other high vector information exists) |
| Type | 1 | Information for selecting pointer movement function | |
| | | 0x01 | Control character is included |
| | | 0x02 | Bitmap format |
| | | 0x04 | String data is mixed |
| | | 0x08 | High vector: partial image |
| | | 0x10 | High vector: 3-dimensional image |
| | | 0x20 | High vector: moving image |
| | | 0x40 | High vector: dependently image (requiring addition with low vector) (if not set, dual image) |
| | | 0x80 | Color information for high vector exists |
| ID | 2 | identifier to be called for partial image | |
| Mode | 4 | * information indicating current setting state, mainly<br>* type of switch related to CALLGRIM's condition<br>* indicating whether identifier of control type exists after CTRLEX<br>* indicating whether default partial image is included | |
| Pini | 4 | Starting point indicating relative position with respect to other image | |
| Color | 4 | Color of current pixel (omit color information if the color is identical to preceding pixel) | |

(B) Extended header

| Name | Size (byte) | Description |
|---|---|---|
| GrimHeader | 16 | Identical to the format of basic header |
| Post | 8 | Address of called image |
| Name | 12 | String identifier, such as file name, etc. |
| | | |

FIG. 2

When high 4 bits of the first byte of the control character is 0xf, the meaning of the control parameter according to the low 4 bits (1~f) is described as follows:

| Control character | Description (control parameter) |
|---|---|
| 0xf0 | Next 1 byte is control character (refer to FIG. 3B) |
| 0xf1 | Low 3 bytes corresponds to mode of header configuration factor |
| 0xf2 | Low 3 bytes are color information |
| 0xf3 | Low 3 bytes are color information for high vector |
| 0xf4 | Color information (low 3 bytes) + vector Right |
| 0xf5 | Color information (low 3 bytes) + vector Down |
| 0xf6 | Color information (low 3 bytes) + vector Left |
| 0xf7 | Low 3 bytes are hide vector (coordinate moves only) |
| 0xf8 | Low 3 bytes are new coordinate (X, Y, each 1.5 byte) |
| 0xf9 | Low 3 bytes are offset to jump |
| 0xfa | Low 3 bytes are new high vector coordinate |
| 0xfb | Low 3 bytes are high vector offset to jump |
| 0xfc | Low 3 bytes are time information |
| 0xfd | Low 1 byte is required; image identifier to be called of 2 bytes |
| 0xfe | Low 3 bytes are string |
| 0xff | Perform string process until 0xff character appears again or perform different process based on the type of byte immediately after 0xff |

Note)
Each of 0xf1 ~ 0xfe means parameter of 3 bytes;
0xf0 means additional control character of 1 byte + parameter of 3 bytes;
0xff means control with variable length and additional control character of 0~1 byte.

FIG. 3A

When the first byte is 0xf0, the meaning of the control parameter corresponding to the low 2 bytes, according to the second byte value, is described as follows:

| Control character (1st byte) | Control character (2nd byte) | Description (control parameter) |
| --- | --- | --- |
| 0xf0 | 0x10 | Next (low) 2 bytes are its image identifier |
| | 0x11 | Low 2 bytes are hide vector |
| | 0x12 | Next 2 bytes are new x-coordinate |
| | 0x13 | Next 2 bytes are new y-coordinate |
| | 0x14 | Next 2 bytes are new x offset |
| | 0x15 | Next 2 bytes are new y offset |
| | 0x16 | Next 2 bytes have priority of indication |
| | 0x17 | According to the value of next 2 bytes, return current position to Pini, Post, Origin, or starting point of next image; and operate call switch in the mode |
| | 0x18 | High 2 bytes of CALLGRIM address |
| | 0x19 | Low 2 bytes of CALLGRIM address |
| | 0x20~ | Movement control of similar type of coordinate; high vector includes offset relative to low vector; and low vector includes offset relative to high vector |
| | 0x40 | Perform repetitions by number corresponding to next 2 bytes |

FIG. 3B (A) View illustrating the principle of Bezier curve drawing
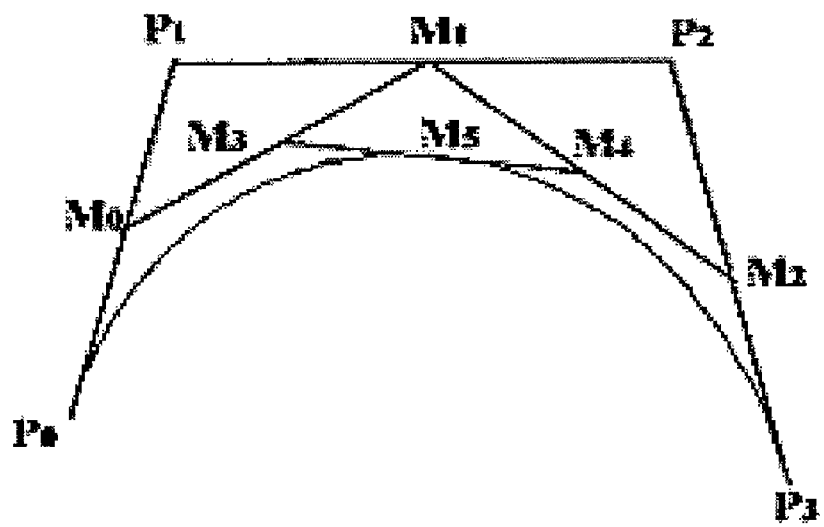
(B) Conceptual drawing for describing a free curve drawing method using vector pixel
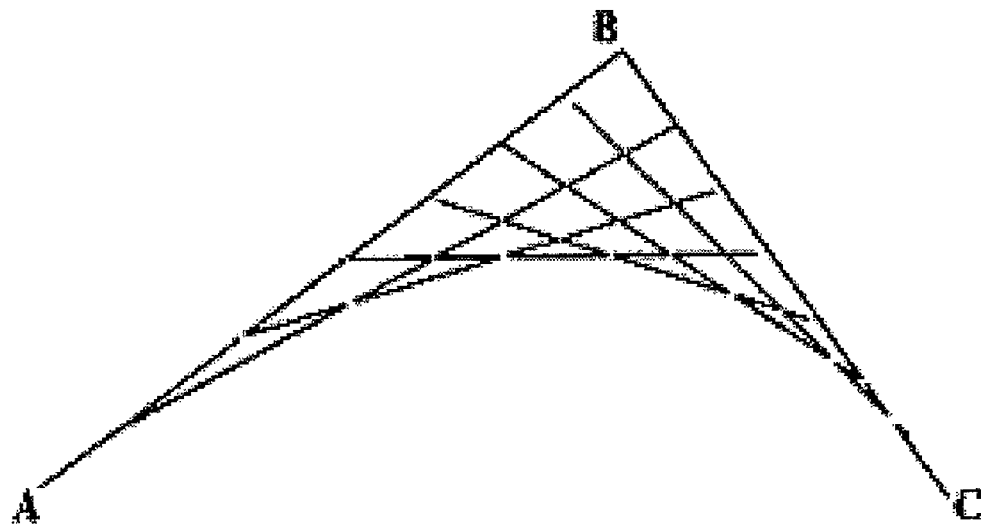
FIG. 6

Direction: U, D, L, R, F, B, LU, LD, RU, RD,
FU, FD, FL, FR, FLU, FLD, FRU, FRD,
BU, BD, BL, BR, BLU, BLD, BRU, BRD

IMAGE PROCESSING SYSTEM USING VECTOR PIXEL

PRIORITY

This application claims the benefit under 35 U.S.C. §119 (a) of two Korean patent applications filed in the Korean Intellectual Property Office, the first filed on Apr. 10, 2006 and assigned Serial No. 2006-0032274 and the second filed on Sep. 25, 2006 and assigned Serial No. 2006-0092801, the entire disclosures of both of which are hereby incorporated by reference.

BACKGROUND OF THE INVENTION

1. Field of the Invention

The present invention relates to an image processing system. More particularly, this invention relates to an image processing system using vector pixels that draws, magnifies, reduces, rotates, and transforms figure and an image, including a unit of data, i.e., direction information of one of 8 vectors, up, down, left, right, up-left, up-right, bottom-left, and bottom-right vectors, when a drawing is drawn and an image is processed in a computer program. The image processing system also writes, reads, and stores the data with respect to a computer.

2. Description of the Related Art

In general, an expression unit of a picture, i.e., an image, used by a computer program is classified into a coordinate displaying a drawing and an image element (hereinafter referred to as a pixel) displaying bitmap. The coordinate (for example, Cartesian coordinate system), requires 4 bytes (2 bytes for X coordinate, and 2 bytes for Y coordinate) to represent a point on the numerical horizontal axis (X-axis) and numeral vertical axis (Y-axis). The pixel represents a color of a point using 3 bytes where each byte is assigned to a primary colors, Red, Green, and Blue.

Therefore, when location information and color information for a point is simultaneously and independently represented, 7 bytes per point are needed. That is, such a representing method consumes a relatively large amount of memory. Therefore, the method is hardly used, except in an extreme case. Thus, in general, an image is displayed in such a way that a pixel of 3 bytes in a rectangle whose length and width are predetermined is sequentially aligned.

Presently, graphic interchange format (GIF), joint photographic experts group (JPEG) and bitmap (BMP) are used as image file formats, and have the features, respectively, as follows.

Most of images in the present web site are in the JPEG (JPG) and GIF file format. The JPG and GIF file formats have been widely used because they have a remarkable compression ratio and other advantages. There are small differences between the JPG and GIF file formats, such that the JPEG file format is applied to a photograph or an image requiring a number of colors, and the GIF file format is applied to the remaining cases.

Specifically, the GIF file format is widely used for icons, etc., in a homepage since the GIF file requires a relatively small amount of memory when an image of GIF file format is stored based on 256 colors. All moving graphics on the Internet are in the GIF file.

The JPEG file format allows a photograph or image having a number of colors to reduce its capacity at a high compression ratio when it is stored.

The BMP file refers to an uncompressed file whose size is relatively large. Therefore, when such a BMP file is displayed on the webpage, it makes the webpage display very slow. In general, the webpage uses compressed files. But, as the compress ratio is increased, image contrast is decreased.

Compression is divided into lossy compression and non-lossy compression. The basic principle of compression for an image is to reduce repeated colors (contents) based on a certain rule.

JPG file is compressed with a lossy compression. JPG file format can display a color though 24 bits, or express 224 (16,777,216) colors. The lossy compression method is called this because an image loses its quality as the number of color of the image is repeatedly reduced while compressing. However, since the JPG file format can express an image based on expressible colors, it is proper to be applied to real images, such as photographs. Above all, the JPG file format has a high compression rate.

GIF file is compressed with a non-lossy compression. That is, GIF file format allows an original image file to be compressed without losing its original quality. However, since the GIF file format uses only 8 bits for color information, it can express an image based on only 256 colors. When an image, such as a photograph, is transformed based on the GIF file format, it means that the converted GIF image cannot be expressed in various colors other than these 256 colors. Therefore, the GIF file format is more suitable to process a user's drawn picture.

A Portable Network Graphics (PNG) file format is created by combining both advantages of the JPG and GIF file formats. The PNG file format supports the high resolution of JPG file format, the transparency of GIF, non-lossy compression, and metadata (additional information, for example, layer information, etc.). However, the PNG file format does not support an animation function, and has not yet been adapted by web browsers.

A computer aided drawing (CAD) application program, such as the well-known Auto CAD, displays a drawing in such a way that drawing information uses four bytes for coordinates. That is, due to the burden of quantity of the drawing information (memory capacity, disk storage capacity, communication speed reduction, etc.), such drawing program saves information for only essential points. For example, the program saves only the starting and end points of a straight line and the center point of a circle, and a certain reference point of a curve. Therefore, the program draws a drawing by connecting a straight line, arc, or Bezier curve, etc. As well, the CAD program minimizes color expression to reduce the quantity of data.

On the other hand, the bitmapped image used in the Microsoft Windows stores data in such a way that its color information of three bytes for each pixel in a predetermined rectangle shape is sequentially arrayed. Therefore, since the BMP file format has to assign color information to portions of a mono color, which are meaningless, it makes a BMP file increase. To compensate for such problems, various file compression technologies has been developed. Depending on compression techniques, the graphic file formats are JPG, GIF, tagged image file format (TIF), PNG, etc. However, since image compression must be performed based on the rectangle shape, it is difficult to display an image of a certain shape. To compensate such a problem, there is a method for transparently processing a specific color (GIF manner), and a method (MS Windows Bitmap) where a simple image is used in combination with a mask (MS Windows Bitmap).

As such, since the general and conventional image processing methods do not meet the trend where compression ratio is high and compression speed is fast for moving images, 3-dimensional graphics, various types of fonts, which are used in the computer application fields, moving images of games, mobile computing, and animation, etc. Therefore, it requires technology where direction information and color information can be simultaneously displayed and at the same time their data size is minimized.

SUMMARY OF THE INVENTION

Therefore, the present invention has been made in view of the above problems, and it is an object of the present invention to provide an image processing system for creating and performing a new file structure that can change image data expression manner and basically reduce the amount of data and amount of work to produce an image, instead of using a conventional data compression technique through which an image file is compressed in BMP, JPG, GIF, etc, file formats.

It is another object of the present invention to provide a method for magnifying and reducing a drawing, which has been already drawn, in a certain direction, as a vector is easily replaced, composed, and copied using various functions for handling character stream, thereby compensating the conventional drawbacks in that, since a general CAD program cannot transform its drawings after finishing drawing, it must complete complicated calculations before drawing.

The conventional image processing method is performed in such a way that, since color information of an image file having a structure listing color information includes all numbers including 0 and thus cannot have additional control characters, etc., the length of data followed is declared at the beginning and then the data length is fitted, similar to TIF file format or PNG file format. Therefore, its process is complicated and its efficiency is low. To solve the problem, the present invention provides an image processing system that does not firstly declare the length of data followed.

It is another object of the present invention to provide a method for freely drawing various lines and drawings using Bresenham's line/circle drawing algorithm and Bezier's curve drawing algorithm and to provide an optimal transformation and replacement method.

Yet another object of the present invention is to provide an image processing system for effectively implementing a 3-dimensional image, based on characteristics where 3-dimensional information is included in a file structure to move/replace drawing points and where 3-dimensional coordinates are expressed through simple data structure.

In accordance with an aspect of the present invention, an image processing system is provided. The image processing system includes a vector pixel with 1 byte, in the low 4 bits of which a vector information portion is positioned, and information of one of 8 vectors, up, down, left, right, up-left, up-right, bottom-left, and bottom-right vectors, with respect to X- and Y-axis, is stored, a data unit structure forming a partial image by combining the vector pixel, having a boundary indicator for indicating the boundary of the partial image at the end of the data unit structure, a data portion forming a complete image by combining the data unit, having a terminator for indicating the termination of the complete image at the end of the data portion, a file generation unit for forming the data portion according to a specific command, and generating/storing a computer image file based on the data portion and a data processing unit for processing direction indications according to vector information of the image file generated by the file generation unit and for forming an image based on the direction indication process.

In an exemplary embodiment, the vector pixel of 1 byte is configured to store vector information of the front and back direction with respect to the Z-axis in the two bits of the high 4 bits.

In an exemplary embodiment, the vector pixel of 1 byte is configured to store vector information identical to that of the vector information portion in the high 4 bits.

In an exemplary embodiment, the system may further include a header at the front of the data portion. The header stores one of a starting point, coordinate value, additional vector information, or color information to assist in a function of the data portion or to declare a command process.

BRIEF DESCRIPTION OF THE DRAWINGS

The above and other objects, features and other advantages of the present invention will be more clearly understood from the following detailed description taken in conjunction with the accompanying drawings, in which:

FIG. 2(A) and FIG. 2(B) are views describing headers of an image file according to an exemplary embodiment of the present invention;

FIG. 3A and FIG. 3B are views describing a controlling unit according to an exemplary embodiment of the present invention;

FIG. 6(A) is a view illustrating a principle of drawing a Bezier curve using the image processing system according to an exemplary embodiment of the present invention;

FIG. 6(B) is a view illustrating a principle of drawing a free curve, which is different from the Bezier curve drawing method, using the image processing system according to an exemplary embodiment of the present invention;

Throughout the drawings, like reference numerals will be understood to refer to like parts, components and structures.

DESCRIPTION OF EXEMPLARY EMBODIMENTS

Figure 1:
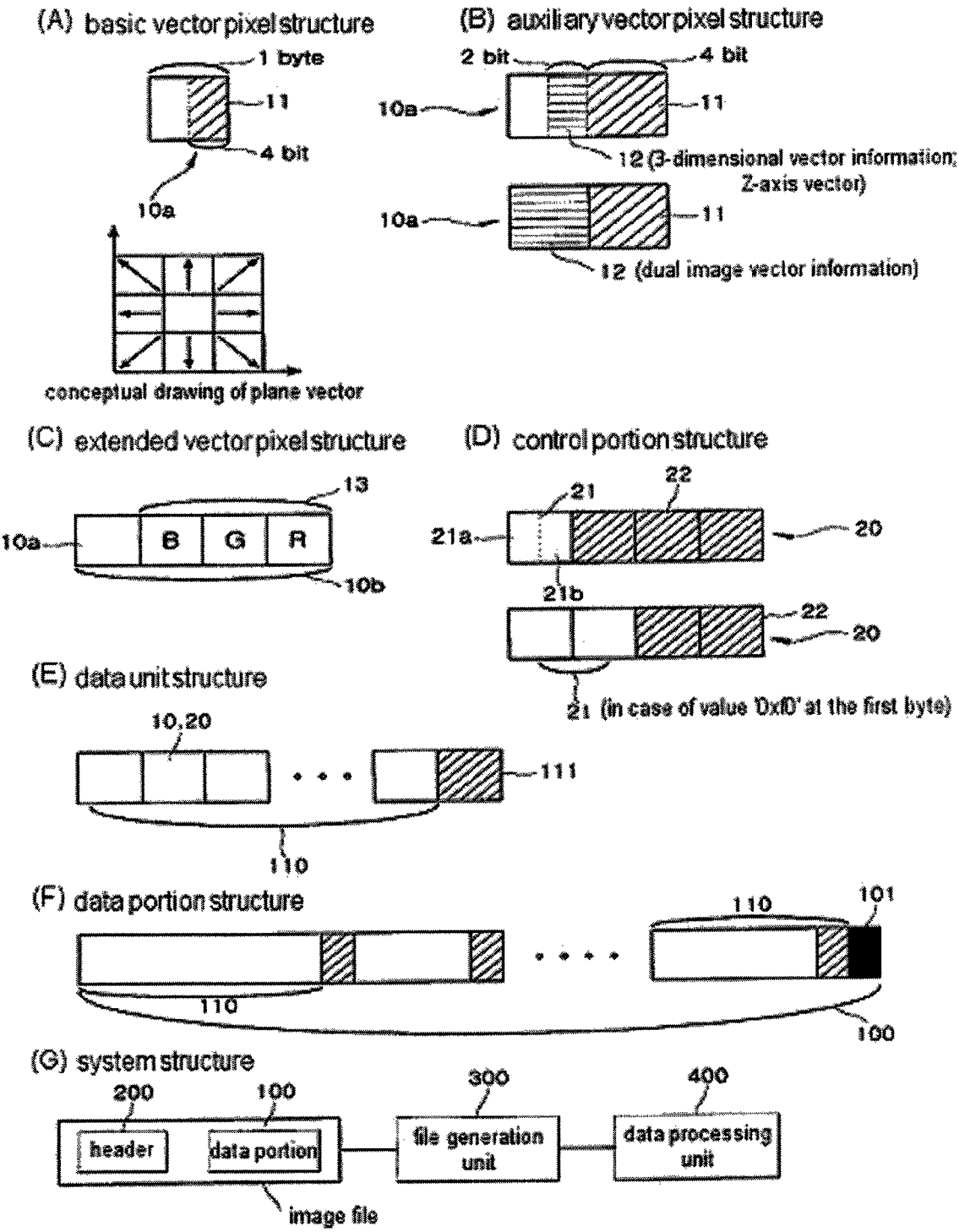
FIG. 1(A) to FIG. 1(F) are views illustrating configuration elements of an image processing system using a vector pixel, according to an exemplary embodiment of the present invention.
FIG. 1(G) is a schematic block diagram of the image processing system using a vector pixel, according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

1. Description of Image Processing According to Exemplary Embodiments of the Present Invention FIG. 1(A) to FIG. 1(F) are views illustrating configuration elements of an image processing system using a vector pixel, according to an exemplary embodiment of the present invention, and FIG. 1(G) is a schematic block diagram of an exemplary image processing system using a vector pixel.

As shown in FIG. 1(A) to FIG. 1(G), an exemplary image processing system of the present invention is executable in a computer. Firstly, a basic data structure and relation thereof for the image processing system will be described.

An exemplary basic data structure of the present invention is configured as a vector pixel 10 used as a basic data minimum unit. That is, the vector pixel 10 is a basic vector pixel 10a configured such that information from one of 8 vectors up, down, left, right, up-left, up-right, bottom-left, and bottom-right vectors is stored in lower four bits of 1 byte, or an extended vector pixel 10b configured such that the color information of 3 bytes is additionally stored in the basic vector pixel 10a.

The image processing system is configured in such a way that: the vector pixel 10 is composed of the basic/extended vector pixels 10a and 10b having the direction information that can be expressed by 8 vectors; a data unit structure 110 for expressing an image is formed while the vector pixels 10 are successively listed/combined; a data unit 110, which express the total image as the data unit structure 110 is combined, is created according to a specific command; a file generation unit 300 stores the data unit 100; and a data processing unit 400 implements an image from information of the file generation unit 300 and form a command.

A control portion 20 containing control information, which is combined with the vector pixel 10 in the data unit structure 110, is composed of in total of at least 4 bytes, one upper byte to which a control character 21 is assigned and lower three bytes to which a control parameter 22 necessary for performing commands of the control character 21 is assigned. The control portion 20 can auxiliary assist in the vector pixel 10. Such a control portion 20 is referred to as an auxiliary unit of the image processing unit.

That is, the vector pixel 10 as a basic unit is combined with the control portion 20 as an auxiliary unit to form a data unit structure 110 that is classified by a boundary indicator 111 of a certain value. A function of the file generation unit 300 is to gather more than one data unit structure 110 to form the data portion.

According to an exemplary system of the present invention, the data portion 100 is set in such a way that a header 200 may be selectively added to the front of the data portion 100 such that it can secure a basis to perform a command as a starting portion, having a declaration meaning or a basic assumption.

An exemplary system of the present invention, having a basic configuration as described above, makes 8 vectors, up, down, left, right, up-left, up-right, bottom-left, and bottom-right vectors, to be included in unit data when a drawing is drawn and an image is processed by a computer program, to magnify, reduce, rotate, and transform the drawing or image.

Also, an exemplary system of the present invention enables a computer to write, read, and store the above-described data, simultaneously.

More specifically, the basic unit of the above-described data refers to a vector pixel (hereinafter called 'VEXEL') 10, one of the basic vector pixel 10a of 1 byte or the extended vector pixel 10b of 4 bytes. Here, the basic vector pixel 10a is composed of a vector information portion 11/auxiliary vector information portion 12 that stores a character stream format of a single vector, which is expressed by hexadecimal (hereinafter expressed by '0X1'~'0Xf'), or vectors. Also, the extended vector pixel 10b is composed of the color information portion 13, which includes color information of 3 bytes, and the basic vector pixel 10a affixed to the color information portion.

Specifically, the vector pixel 10, formed as a 1 byte unit, stores information about one of 8 vectors in the vector information portion 11 of the lower 4 bits thereof. Also, the vector pixel 10 stores a separated independent vector is the upper 4 bits thereof or adds an additional vector corresponding to one-dimension of the 3 dimensions (or information about front or back directions of Z-axis) in the high 4 bits thereof. Optionally, the vector pixel 10 adds a control portion 20 that includes a control command in more than one successively data, thereby enabling various functions.

The set of the basic vector pixel 10a of the vector pixel indicating the direction information becomes a data stream of 1 byte, i.e., a string, in their format. Therefore, a string process function (for example, strcpy, strcat, strlen, etc. of language C) that the register of a computer's CPU directly processes can be used. Also, configuration points of a drawing that has been already been drawn by the vector pixel 10 can be handled, respectively. Further, the group of the extended vector pixel 10b can be easily transformed from the basic vector pixel.

In general, since color information of an image file having a structure listing color information includes all values including 0 and thus cannot have additional control characters, etc. In order to resolve the problems, there is a method where length of data followed is declared at the beginning and then the data length is matched to this, similar to the format TIF or PNG file follows. Therefore, its process is complicated and its efficiency is low. Thus, exemplary embodiments of the present invention provide an image processing system that does not previously declare the length of data followed in an image file by means of the vector pixel 10, and then solve the problems.

Since the basic concept of the vector pixel 10 according to an exemplary embodiment of the present invention is that the vector pixel 10 includes only direction information without including coordinates, a distinction lies between the concept of vector adopted by the conventional drawing. An exemplary vector of the present invention is not very different from the conventional vector. Exemplary embodiments of the present invention have a structure that may add the color information as occasion demands, while forming the basis of a well-known image file, and thus fundamentally differs from the conventional method. Therefore, the image file formed as successive vector pixel structures 10 are combined (the combination units are a data unit structure and a data portion), cannot strictly be regarded as an image file. Such an image file may be referred to as a "GRIM" file. Although it is, the image file may not be classified as a category of CAD file that does not have direction information but has location information. Because, unlike the CAD file having reference points, an exemplary image processing system of the present invention has direction information about all points to display in respective successive vector pixels 10 for image implement.

From these reasons, the conventional CAD file cannot be read without a function for drawing a straight line or circle, i.e., a parameter drawing function, but the GRIM file according to an exemplary embodiment of the present invention can be read without the parameter drawing function. Even the Windows metafile format (WMF) file supported in the MS Windows requires a drawing function built-into MS Windows.

In other words, the concept of the vector that exemplary embodiments of the present invention introduced is a unit vector that does not have location information but only direction information, and data whose type is a string. From this point of view, the concept of the vector of exemplary embodiments of the present invention is fundamentally different from that of vector graphic or vector font, both of which are formed based on numerical coordinate data. That is, since the vectors are each a vector where the coordinate numerals without direction indication are sequentially read and analyzed, this concept of a vector is different from the original meaning of a vector. However, an exemplary vector of the present invention is a vector having a mathematically complete meaning.

1.1 Set of Unit Vector (1) The unit data for an exemplary system of the present invention refers to basic data, i.e., a set of successive vector pixels 10. The magnitude of the unit vector is 1 but may be changeable as occasion demands. For example, after all processes are completed based on the definition where the unit vector is 0.1 in its magnitude, the complete result is multiplied by 10 times to obtain the final result (i.e., to extract one unit from every 10 units), which makes a sophisticated and high quality image to be obtained. Changing the magnitude of the vector can be implemented by adding such a function to the data processing unit 400 in an application utilizing an exemplary system of the present invention. The example of such functions could be referred to as a magnitude changing module.

(2) When an exemplary embodiment of the present invention is applied to the machining fields, if a machining unit is set based on micron unit or 0.1 mm according to accuracy, the machining result can be identically obtained without an additional change.

1.2 Pixel having Direction (1) The conventional drawing or image data is indicative of a numerical coordinate but does not have direction. On the contrary, the vector pixel 10 according to an exemplary embodiment of the present invention has only direction, showing various characteristics. For example, when points of the right or left with respect to the proceeding direction of the vector pixel are successively obtained, a certain curve can be drawn with a certain thickness (a drawing method through a dual picture structure, which will be described later). Also, the vector pixel can determine whether a point is inside or outside with respect to certain closed curve.

(2) An exemplary vector pixel according to the present invention has a sequence. Conventional graphic data having well-known coordinate values have same meaning regardless of their sequences, because displaying several points in a different order results in the same look. However, when such a process is applied to an exemplary vector pixel 10 of the present invention, the process results are different. Also, since the position of a certain point is determined by the sum of the unit displacement (unit value: 1) of former vectors, when the direction of one point is changed, all following points are changed in their position. Such property makes it possible to shape edit, synthesize two data unit structures (110), and draw an image related to a symmetric shape.

1.3 Principle of Omission

The image processing system using vector pixel, according to an exemplary embodiment of the present invention, omits data that is not essential. On the contrary, the conventional method never omits image data even if it is not needed. That is, the conventional method fills 0 for all unnecessary image data in a certain frame.

More specifically, as an example, the header 200 optional may be omitted. And, as another example, a meaningless portion of a rectangle image, such as a background image fills, could be omitted through a command of a control portion 20. As described above, these examples are performed based on a characteristic where the data unit structure 110 can include the control portion 20, and a pixel having direction can include the position.

2. Basic Structure of Data and File according to an Exemplary Embodiment of the Present Invention

2.1 Data Structure

FIG. 1 shows a pixel (one point of a screen), i.e., vector pixel 10 (Vexel) and data such as an accessory control portion 20, a data unit structure 110 created as they are combined, a structure and configuration of a data portion 100. Such configurations are classified based on structures of bytes as follows.

(1) Structure Formed within a Range of 1 Byte a. Basic vector pixel 10a: to store one of 8 vectors, up, down, left, right, up-left, up-right, bottom-left, and bottom-right vectors, in the lower 4 bits of 1 byte, i.e., the vector information portion 11 (refer to FIG. 1(A)). On the other hand, a value stored in the higher 4 bits of 1 byte, i.e., the auxiliary vector information portion, will be described later.

b. Boundary indicator 111: to indicate a boundary between data unit structures expressing a part of an image by having a certain value (preferably, hexadecimal value ff) or to classify variable length data, which will be described later (refer to FIG. 1(E)~FIG. 1(F)).

c. Terminator 101: bits having a certain value indicative of the end of a data portion 100 expressing the entire image indicates the termination of the entire image (refer to FIG. 1(F)).

d. 3-dimensional vector information: to indicate that front and back vectors (for example, z-axis related direction), which are formed by 2 bits, are stored in an auxiliary vector information portion 12 as well as the 8 vectors stored in the vector information portion 11 (refer to FIG. 1(B)).

e. Dual picture vector information: to mean that the auxiliary vector information portion 12, i.e., the higher 4 bits of the basic vector pixel 10a, has the same vector information as the vector information portion 11.

(2) 4 Byte Structure a. Extended vector pixel 10b: a structure that includes 3 bytes of color information portion 13 affixed to the basic vector pixel 10a of 1 byte unit, in which the color information portion 13 includes information about primary colors, red (R), green (G), and blue (B) colors.

b. Control portion 20: a structure of at least 4 bytes where 1 byte of control character 21 is assigned to the first or second byte of the 4 bytes, preferably the first byte, and 3 bytes of control parameter 22 necessary for performing the command of the control character 21 (when the control character takes 2 bytes, the control parameter has at least 2 bytes). The control portion 20 is not a pixel expressing one point but forms a data unit structure 110 as it simultaneously performs/combines with the vector pixel 10. That is, the control portion 20 of 4 bytes can express additional vector information and color information. Also, the control portion 20 generates necessary commands and performs them so that it can auxiliary assist in the function of the vector pixel 10 having only direction information. Such operations are described in detail with reference to FIG. 3.

(3) Data Structure with Variable Length a. Unstructured data: data (generally, text information) other than a pixel, starting with a delimiter having a certain value and ending with another delimiter.

b. Data unit structure 110: to perform a function implementing a partial image. The data unit structure 110 ends with a boundary indicator 111 and may include the vector pixel 10, the control portion 20, or the unstructured data.

c. Data portion 100: to perform a function implementing the entire image. The data portion 110 is ended with the terminator 101 and may be combined with the data unit structure 110. And, the data portion 110 positions a header 200, which will be described later, at its front (refer to FIG. 1(F)).

2.2 Structure of Header (1) Basic Header

Composed of 16 bytes: 1 byte of control, 1 byte of type, 2 bytes of ID, 4 bytes of mode, 4 bytes of Pini (coordinate of starting point), and 4 byte of color. Details are described in FIG. 2(A).

(2) Extended Header

Having 8 bytes of post and 12 bytes of name, in addition to the basic header. Details are described in FIG. 2(B).

2.3. Structure of Image File

FIG. 1(G) shows the structure of an image file, composed of a header 200 and a data portion 100. The header 200 may be optionally omitted according to conditions.

2.4. Structure of an Exemplary System of the Present Invention

As shown in FIG. 1(G), an image file composed of a header 200 and a data portion 100. A file creating unit 300 processes the image file to create a file, based on a certain command and a necessary combination purpose. A data processing unit 400 processes/controls a command for a control portion 20 in the header 200 and data portion 100 to output an image to a monitor.

3. Characteristics of Data Structure for the System According to an Exemplary Embodiment of the Present Invention 3.1 Characteristics of Basic Vector Pixel 10*a* and of Data Structure of Collection Thereof (1) The structure does not have numeral coordinate information except for direction information.

The conventional CAD file and font file have numeral coordinate information as basic data. On the contrary, exemplary embodiments of the present invention are configured to have the basic vector pixel 10*a*. Therefore, in exemplary embodiments, the present invention's characteristics appear quite different, compared with those of the conventional method. Any graphic method processing vector data, not numeral coordinate data, as the primary data has not been publicly known until now.

(2) The structure stores position information (vector format) of all configuration points to be displayed.

In general, a drawing is stored in a computer with representative positions of its configuration data, such as the starting and end points, and center point, etc., because of simplicity of the data contents and burden of excessive memory to keep them comparing handiness to get additional information as occasion demands. On the contrary, exemplary embodiments of the present invention can express all the points for a drawing at one time using the vector pixel.

That is, one point can be expressed by ½~1 byte of vector. Therefore, the burden of memory is reduced. Also, due to having the information of all positions, a corresponding drawing can be edited.

(3) The structure defines a boundary indicator 111 indicative of the end of the data unit structure 110.

Since the conventional drawing or image data includes all values including 0, it cannot additionally have a character or information for a specific usage. However, the exemplary vector pixel 10 of the present invention is configured based on 1 byte unit, in which 4 bits of the 1 byte, which can express 16 kinds of numerals, expresses 8 kinds of directions, and the remaining 4 bits may be used for various functions. Here, the boundary indicator 111 is positioned at an additional byte space at the end of the data unit structure 110. However, since the object of the boundary indicator 111 can be achieved using only 4 bits, the vector pixel 10 is configured in such a way that the boundary indicator 111 can be positioned at the high 4 bits, which corresponds to the auxiliary vector information portion 12, instead of the auxiliary vector information portion 12.

(4) The structure has a terminator 101 indicative of the end of the data portion 100.

The structure must have zero as a terminator 101 indicative of the end of the data portion 100. Because it can be compatible with string data of the C program language, and provides other advantages.

(5) The structure includes a control portion 20.

The control portion 20 is to compensate/extend functions of the vector pixel 10 having only direction information. The control portion 20 enables various commands to be performed, which will be described later.

3.2 Characteristic of Extended Vector Pixel 10*b*

(1) The extended vector pixel 10 refers to a format where color information is added to the basic vector pixel 10*a*.

The extended vector pixel 10*b* succeeds in all the characteristics of the basic vector pixel 10*a*. When the color information is the same as that of the immediately preceding pixel, it can be omitted according to the setting of the header 200 or the control portion 20.

(2) The extended vector pixel 10*b* is not a preset rectangle or a fixed shape.

The conventional image file has a format where color information is sequentially listed, regarding the rectangle whose length and width are all preset. On the contrary, since the position of the exemplary vector pixel 10 of the present invention is determined by the vector information portion 11, it can have a certain shape. That is, the vector pixel can omit a transparent portion or a background portion having the same color.

(3) A well-known header is not necessary for setting a size.

The following is a foregone conclusion from the above article (2). That is, most of the conventional image file must have a header even in the case just to show the image size. On the contrary, the exemplary extended vector pixel 10b of the present invention does not have to have a header. That is, although the header 200 may be included, it is not essential. That is, it is optional.

3.3 Characteristic of Control Portion 20

Since the vector pixel 10 can express only relative positions between mutual adjacent points of successive pixels, it needs special configurations to express discontinuous points or add additional vector information, color information, and other functions. To this end, the control potion 20 serves to express, in a command format, information setting a position of presently displayed pixel and other functions. The control portion 20 also serves to perform various functions as shown in FIG. 3, as well as to perform the position set.

Most of the control portion 20 has at least 4 bytes of length, and may have variable lengths, in special.

(1) Configuration of Control Portion 20

As shown in FIG. 1(D), the control portion 20 is composed of at least 4 bytes. That is, the control portion 20 is composed of one or two bytes of control character 21 and at least two bytes of control parameter 22 as auxiliary data (basically, the control portion 20 is composed of one byte of control character 21 and three bytes of control parameter 22).

(2) Control Character 21

The high 4 bits fills with a control indicator 21a of a certain value (default value: '15' in decimal or 'f' in hexadecimal) declaring or expressing the starting point of the control portion 20, i.e., a control character. The low 4 bits fills with a control identifier (0~f in hexadecimal) 21b for identifying type of control.

Then 16 control characters 21 are secured between f0~ff in hexadecimal (hereinafter, 0x as a prefix will be affixed to the hexadecimal). The 16 control characters 21 are described together with their functions, in FIG. 3. Their functions may be changed depending on the system being implemented and are not limited by the present invention.

(3) Control Parameter 22

The control parameter 22 is a parameter necessary for command process of the control character 21 except for the control character 21 of the control portion 20. Here, the type of control parameter 22 is divided into two according to its bytes. As well, the type of control character 21 is also classified into two, which are illustrated in FIG. 3A and FIG. 3B.

The first case is for a command requiring more than three bytes of space, such as color information, X- and Y-coordinates, etc. (which corresponds to 0xf1~0xfe in FIG. 3). The second case is for a command of 2 bytes and is configured in such a way to have an additional control character 21 in the first byte (second byte of the control portion) of the control parameter 22 (which corresponds to 0x10~0x40 in FIG. 3B).

Specifically, the second type is free from restriction where the first byte must process only 16 controls, instead it can secure total two bytes of control characters due to the additional control character 21. Therefore, the second type can further process 255 (=16*16−1) commands, in which the first byte may generate 16 commands through its 4 bits except for its 4 bits of control character indicator 21a, and the second byte may generate 16 commands (although the second byte can theoretically express 256 different pieces of information, it is assumed that the second byte utilizes its space in such a way to express at least 16 pieces of information).

(4) Control of Variable Length

A control of variable length is prepared to insert data, such as a place name, which is difficult to be processed with a constant length. The variable length control is classified by the preceding start and end of a certain control character 21 (whose default value is 0xff).

The first character next to the starting 0xff control character may be an addition control character 21 defining the type of control and be omitted. When omitting, the control means a data unit structure 110, but may be changed in the mode of the header. The addition control may express font type, size, colors, etc. of string (which is not illustrated in the figures).

When the terminator 101 follows immediately after the boundary indicator 111, the boundary indicator 111 can be omitted.

3.4 Characteristic of Header (1) The basic header is included to indicate the position of the starting point, and the meaning of the auxiliary vector information portion 12 of the vector pixel 10, as well as the information defined in FIG. 1(A). Also, the extended header may be included when detailed information corresponding to the ID of the data unit structure 110 is needed.

(2) However, for only 1 or 2 pieces of information, the header may be omitted and the data portion 100 may start with the control portion 20. The various types described in FIG. 3 may be positioned at the front of the image file (except for the types, such as RETURN, which is meaningless when it is positioned at the front the image file). A definition that an image indication proceeding point is at the 'starting portion' is made while the image indication proceeding point is positioned at a position immediately before it escapes from the first point, regardless of header 200.

(3) Therefore, when the definition of the starting portion of item (2) is used, more than two types of headers may be used.

(4) Characteristics for all configuration factors

Factor, Pini, is used to express the coordinate of the starting point. Also, the Pini is needed to indicate a relative position when a call is performed by another data unit structure 110 related to the data unit structure 110, which will be described later, or a large image is formed while plural data unit structures 110 are linked.

The factor, color, indicates colors at a current position. When a duplicate color omission technology, the most commonly used technology of image file compression technologies, is implemented, the factor, color, must be omitted when the color of the next pixel is identical to the factor, color, and to express only vector. Although the present description is not listed, when the item, Hcolor, is further added, color of dual picture, which will be described in dual picture drawing method, can be set. Also, color information is omitted, and thus the possibility that the next point can be expressed by only vector can be increased. Rough statistically, the size of a file can be reduced to approximately ⅓ of its original file size using only the factor, color. Also, the file can be reduced to ½ than its original file size using two reference colors. However, since it took a comparison time whether the reference colors are identical, such method is preferably used when a large picture is processed or a file size is more important than its processing speed.

Factor, post, stores an address of a caller calling itself and indicates a position to go back when performing the RETURN.

Factor, name, is to describe an image file name when a specific data unit structure 110 is in another image file, and indicate an identifier through string when a user desires to set an easily memorable name.

Factor, control, serves to indicate a type of file. The factor, control, indicates the existence and type of the header 200 and an arraying method of color data. The arraying method of color data, as shown in FIG. 3, uses one of 0xf3, 0xf4, and 0xf5, instead of a vector, and then uses color information. When the color information exists, it means that data is of successive images. Therefore, since the position coordinate varies quite regularly, a certain shape can be formed using only 3 directions. However, a color arraying method is additionally prepared for the case where various vector directions are needed. For example, when 'control' of the front of a file is set to 0xf2, all data is read not based on a byte unit but based on a 4-byte unit. Therefore, 8 vectors, not 3, can be all read, but color information cannot be omitted. Adjacent identical colors must be all repeatedly expressed.

Factor, type, indicates type of pictures in more detail. That is, it expresses whether the control character 21 exists, whether high 4 bits of the vector pixel 10 functions as an additional vector, whether low vector of the vector information portion 11 is separated or summed when the high 4 bits functions as an additional vector (basically, it does not function, and if it functions, it is independent), whether color for high vector exist, whether string data exists, and whether 3-dimensional position is expressed.

Factor, mode, indicates a current setting state and, specially, includes several picture call switches. According to On/Off states of the switches, the factor mode can call a part of an image. Also, the factor mode indicates whether name is set or not, whether post is set or not, etc. The factor mode will not be described in detail because it is quite oriented to a programmer.

4. Additional Description of the System According to an Exemplary Embodiment of the Present Invention

4.1 Auxiliary Vector Information Portion 12

The following is a description for characteristics of the auxiliary vector information portion 12, as high 4 bits of basic vector pixel 10a composed of 1 byte unit.

(1) 0x0

It means that the basic vector pixel 10 does not have additional vector information and a determination whether following color information exists is made based on the level of header 20 or the level of data processing unit 400.

(2) Less than 0x3

It is indicative of 3-dimentional vector. That is, when the information of 8 directions includes the value, although the information is a 2-dimensional expression, the basic vector pixel 10a can express 3-dimensional vector because the basic vector pixel has front and back direction information corresponding to the Z-axis.

If the processing speed is important, it can be defined in the factor, type, as described in FIG. 2. However, the default processing method for the vector pixel 10 is to recognize that it is 3-dimensional data. Here, in the case of zero, i.e., when the 3-dimensional vector does not have front and back components, it can be processed in such a way that when it becomes like item (1) or one of 3-dimensional components is zero, i.e., 2-dimensional components.

(3) Other Value

It is an additional vector. The vector can be expressed within 4 bits. It refers to a case where a dual picture is expressed or 1 byte expresses two points, in which the dual picture is expressed so that it can have the same vector information as the vector information portion 11. Preferably, the setting is set by the header 200 or the control portion 20.

4.2 Pointer Moving Function

The present invention is disadvantageous in that, since the vector pixel 10 of the present invention keeps vector information of each unit and additionally includes a variety of commands in the data unit structure 110, its definitions are complicated. When the complicated definitions are sorted one by one, the speed of reading pictures is slow. To resolve this problem, plural functions for moving to the next pixel are prepared first and another definition for selecting a corresponding function among the plural functions is also prepared. Such an implementation is achieved by the type of the second byte of the header.

5. Implementation of Bresenham's Line Drawing Algorithm

Figure 4:
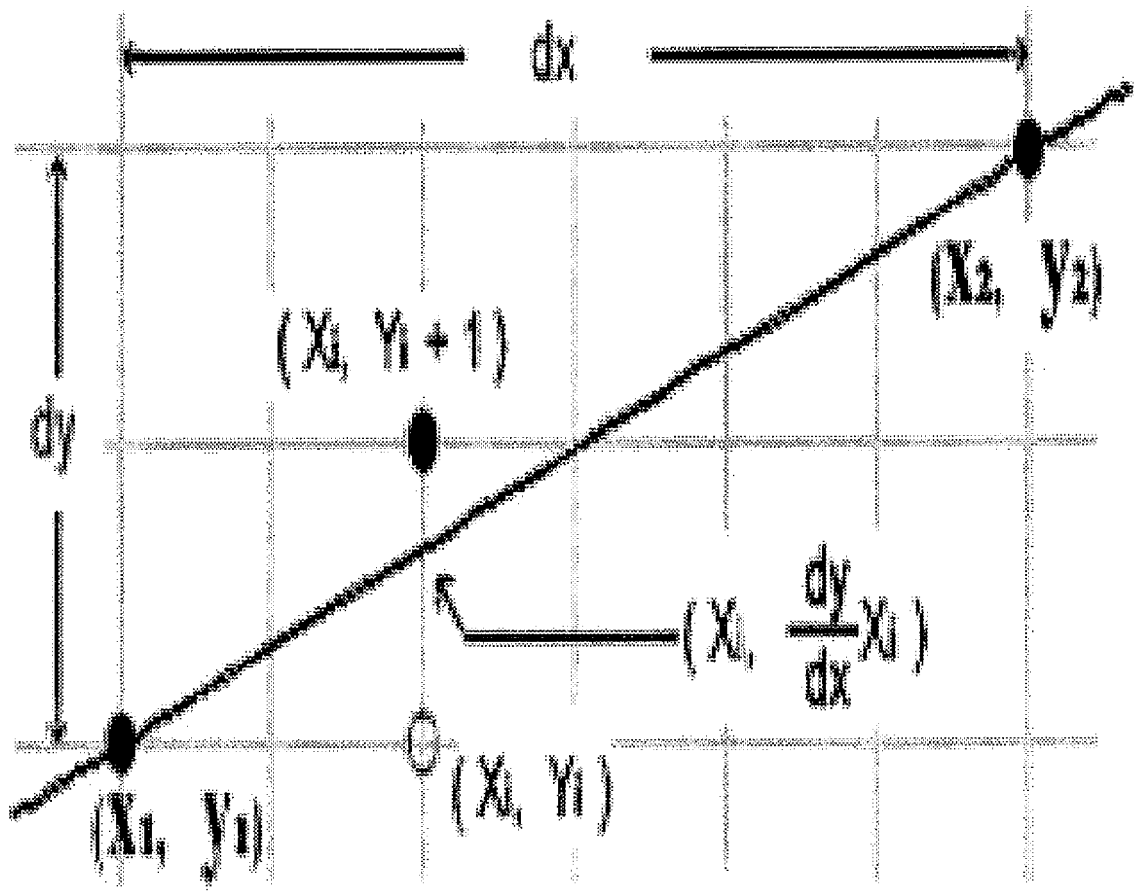
FIG. 4 is a view describing an algorithm of drawing a line by an image processing system according to an exemplary embodiment of the present invention.

FIG. 4 is a view describing a Bresenham's line drawing algorithm.

Figure 5:
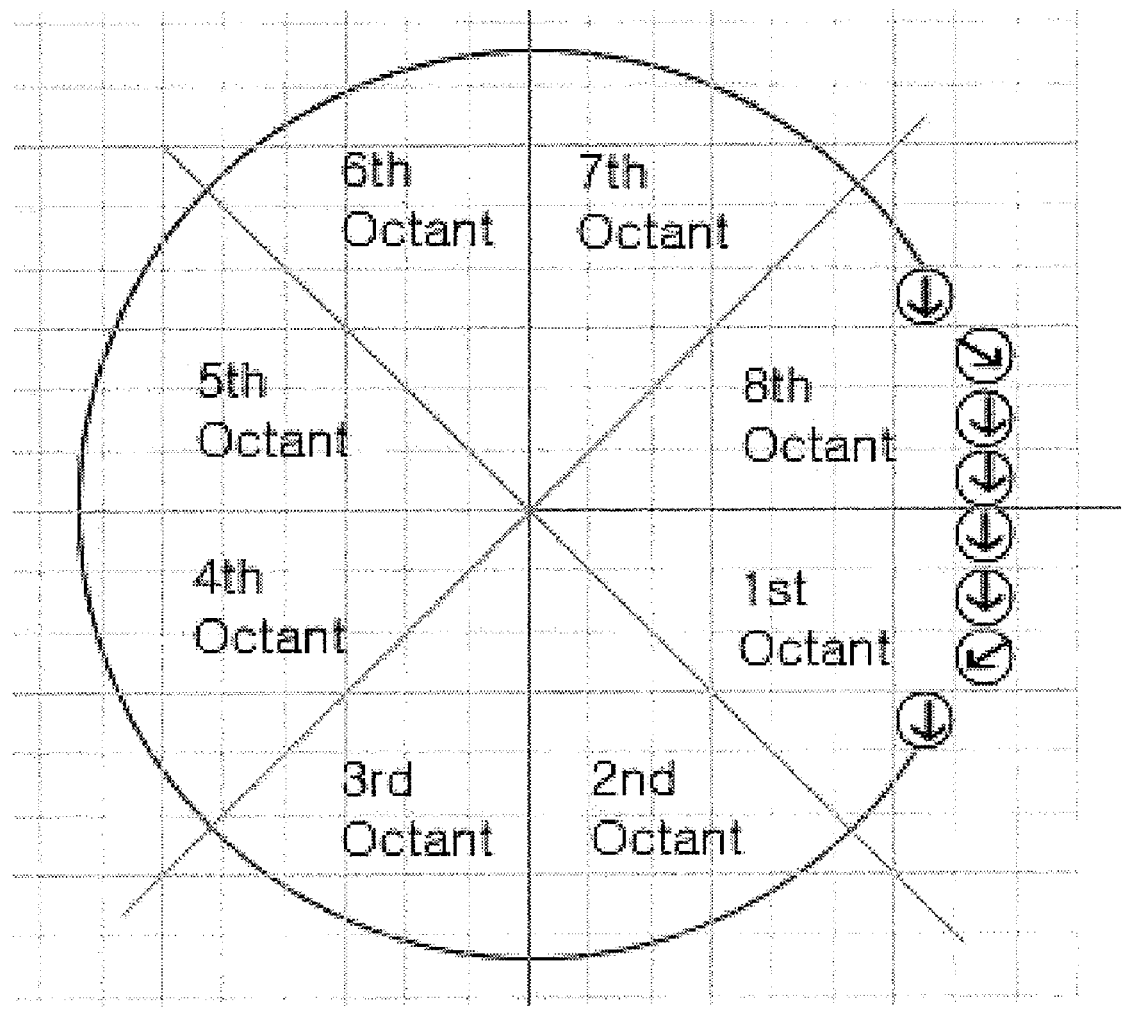
FIG. 5 is a view describing an algorithm of drawing a circle by an image processing system according to an exemplary embodiment of the present invention.

The Bresenham's line drawing algorithm was published by J. E. Bresenham, in 1965, (IBM System Journal 4(1) 1965, pp. 25~30), the entire disclosure of which is hereby incorporated by reference. The basis of the algorithm is to set corresponding pixels of the display as shown in FIG. 5 while pixel sets, closely positioned at the straight line connecting between given two pixels, are expressed by (x, y) coordinates. The mathematical principle of the Bresenham's line drawing algorithm is simple. Y value increases by dy each time the X-value is increased by dx (increment 1 in coordinate). Multiplication and division are replaced with addition and subtraction to achieve proportional calculation. The multiplication is performed as addition is repeated, and the division is performed as subtraction is repeated.

An exemplary system of the present invention is achieved in such a way that a relative position of the point followed by the current point, instead of a coordinate, is outputted through 4 bits, i.e., 8 vectors, up (x'1000'), down (x'0100'), left (x'0010'), right (x'0001'), up-left (x'1010'), up-right (x'1001'), bottom-left (x'0110'), and bottom-right (x'0101') vectors, to store them a data storage space, i.e., a buffer. Although starting with the same principle, the results differ as follows:

(1) A line string outputted by vector hides an offset until an endpoint, without starting and arrival points. As shown in FIG. 5, if a straight line is drawn from a starting point (x1, y1) to an arrival point (x2, y2), when x1 and y1 is changed although dx and dy are not varied, the output by a coordinate manner is changed each time but the output by a vector manner is the same. That is, when straight lines having the same slope and the same length are identical to each other regardless of the positions of their starting points. Such a result occurs naturally due to the vector property. Therefore, although all the straight lines regarding contents of the outputted string are drawn with offsets with respect to the origin, regardless of their actual coordinates, the same result can be obtained.

(2) The length of the string is consistent with a larger vertical component of offset and horizontal component of offset. Such a property exists because the string is outputted by each character (coordinate of one point) while traveling from the starting point to the arrival point, regardless of whether X-value is increased/decreased, Y-value is increased/ decreased, or both X- and Y-values are increased/decreased. Such property is indicated as important in the following description.

(3) Like the Bresenham's line drawing algorithm, the actual straight line drawing program is performed in such a way that: a large component is searched between vertical and horizontal components for each point regardless of increment/decrement of X and Y to determine a basic direction from one of up, down, left, and right and then produce a string corresponding to the size of the selected one; after that, an auxiliary component perpendicular to the selected component, and the magnitude thereof are determined; and an equivalent distribution OR-operation is performed.

Let's give an example where a straight line is drawn from a starting point (0, 0) to an arrival point (3, 10). Since 10 of Y-offset is greater than 3 of X-offset, the basic direction is 'down (↓),' hereinafter referred to as D(↓), and auxiliary component is 'right (→),' hereinafter referred to as R (→), corresponding to the 3 of X-offset. Therefore, the basic string becomes D(↓) of 10, i.e., DDDDDDDDDD, and of them, D(↓) of 3 are added by the auxiliary direction vector R (→), thereby producing 'right-down ((↘)),' hereinafter referred to as RD ((↘)). Consequently, the final result become as D,D, RD,D,D,RD,D,D,RD,D.

6. Implementation of Bresenham's Circle Drawing Algorithm

Like the Bresenham's line drawing algorithm, the Bresenham's circle drawing algorithm is to draw a circle to repeat a procedure in such a way that a coordinate of the next point followed by the former point is obtained. Especially, the algorithm generates only ⅛ of a circle and then calculates a symmetry point with respect to the X- and Y-axis to generate the remaining ⅞ of the circle. That is, one point (x, y) in the first quadrant corresponds to: a point (−x, y) in the second quadrant; a point (−x, −y) in the third quadrant; and a point (x, −y) in the fourth quadrant. Such a description does not related to the arraying sequence of the parts of circle in FIG. 6. The remaining four points become symmetry points of a line for corresponding points in each quadrant, y=x or y=−x. That is, the symmetry point of a point (x, y), with respect to y=x, becomes a point (y, x).

FIG. 5 is a view describing an algorithm of drawing a circle by an image processing system according to an exemplary embodiment of the present invention.

As shown in FIG. 5, an exemplary embodiment of the present invention generates ⅛ of a circle in such a way that a coordinate output is changed to a vector output. However, the symmetry points cannot be generated by the same algorithm because the simple coordinate and a vector having direction are different from each other. Therefore, it needs an algorithm that transforms one ⅛ of a circle to a corresponding arc of the octants of the circle, respectively. Here, as shown in FIG. 5, the octant is generated as a plane is divided into quadrants by X- and Y-axis and then each quadrant is divided by a straight line declined by 45° from each of X- and Y-axis. Here, the octants are referred to as first, second, . . . , eighth octant, along the counterclockwise direction with reference to the positive X-axis.

As shown in FIG. 5, the first and eighth octants include each 4 points at close to the X-axis. The vectors are configured in the first octant (Down, Down, Left-Down, and Down) and in the eight octant (Down, Right-Down, Down, and Down). Therefore, the vectors in the eighth octant are symmetrical to those of the first octant, with respect to the X-axis, when the 'Right' value of the first octant is changed into 'Left' and the whole vector string is reversed. Similarly, the remaining 6 octants may have the transformation rule as follows:

1st octant: Default
2nd octant: Down→Left, Left→Down
3rd octant: Down→Left, Left→Up
4th octant: Down→Up
5th octant: Down→Up, Left→Right
6th octant: Down→Right, Left→Up
7th octant: Down→Right, Left→Down
8th octant: Left→Right
Even octant: Reverse sequence As the above-listed transformations are slightly modified, they can be used for rotation of a drawing or image by 45° unit.

7. Implementation of Free Curve Drawing Algorithm

FIG. 6 is a view illustrating a principle of drawing a free curve by an image processing system according to an exemplary embodiment of the present invention.

Figure 7:
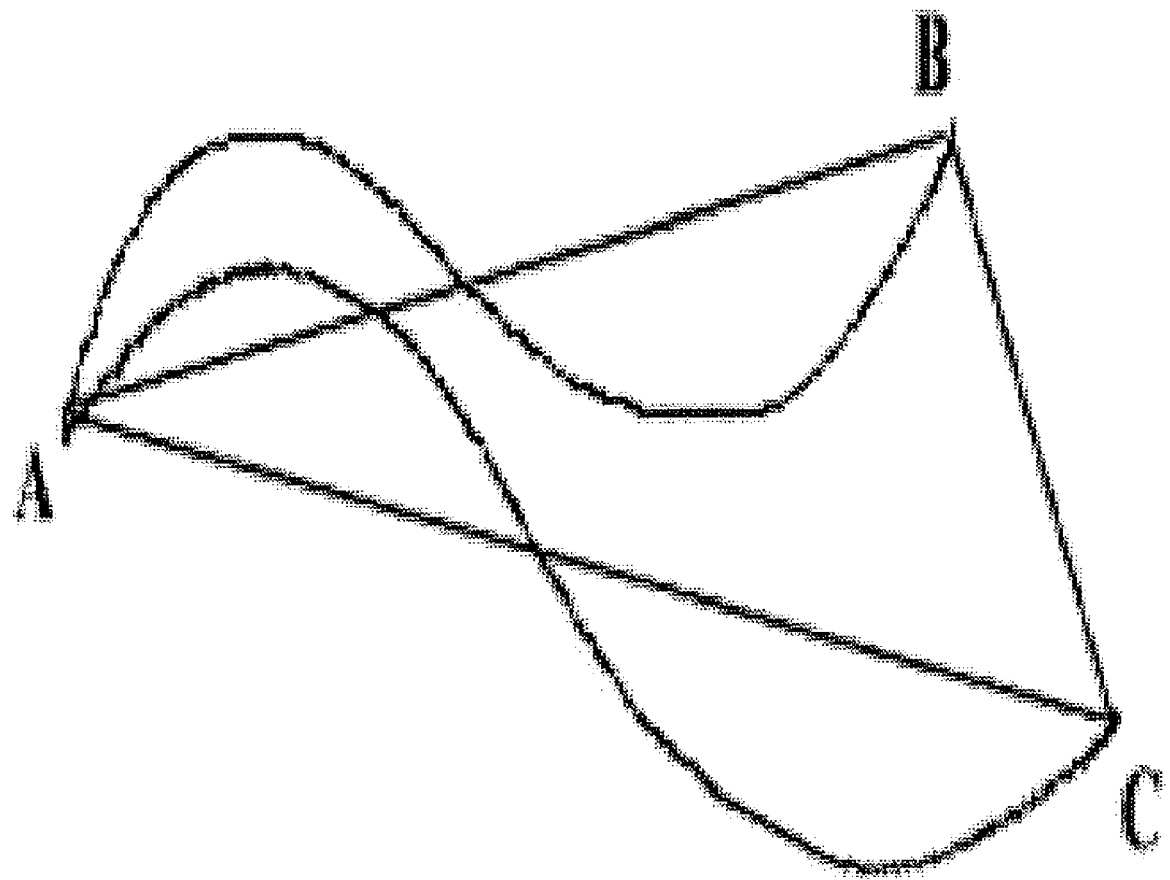
FIG. 7 is a view illustrating a drawing transform principle by an image processing system according to an exemplary embodiment of the present invention.

The free curve drawing according to an exemplary embodiment of the present invention may be implemented with two methods as shown in FIG. 7. One is to implement a Bezier curve in a vector method and another is to a free curve using a vector pixel method as a special algorithm.

(A) Implementation of Bezier Curve

The Bezier curve was originally developed by P. Bezier, working for the French car manufacturer Renault, in the end 1960s. The drawing method is illustrated in FIG. 6(A).

As shown in FIG. 6(A), MO is a midpoint of P1P2, and point M2 is a midpoint P2P3. As well, M3 and M4 are the midpoints of MOM1 and M1M2, respectively. Also, M5 is the midpoint of M3M4. Then, the Bezier curve defined by P0P1P2P3 is divided into two curves, P0M0M3M4 and M5M4M2M3. Now regarding the left partial curve P0M0M3M4, the midpoints are obtained and then the curve is divided into two curves, and so on. Then, the original curve is gradually reduced and eventually close to a straight line. Therefore, when P0 and P3 are connected by the straight line instead of drawing a curve on a proper line, a desired curve can be obtained.

An exemplary system of the present invention is completely implemented as the last straight line is connected by vector string.

However, the high 4 bits of the vector byte, used as a buffer, indicates a mark. With respect to the mark as the reference point, the above process is preformed as follows:

When vector string of the first P0P1P2P3 is created, a vertex (a certain number) is marked at the high bit of a corresponding point of P1 and P2. Then, the midpoint M0 of P1P2 becomes a bisectional point of the string (if the string length is N, the midpoint becomes the N/2-th character) between a corresponding vector of the P1 and P2 according to property (2) of the straight line string. Therefore, the midpoint can be marked at the high bit of the character (M0). Similarly, the midpoints of the P0P1 and P2P3 can be marked through the above-mentioned way. After that, the indicated marks (vertexes and midpoints) are connected by a straight line, thereby obtaining strings corresponding to stages, respectively.

Such a process provides two advantages. Although the original form of the Bezier curve drawing must estimate the number of midpoints previously and prepare memory space to store it, the above process does not have to do this. Also, the original form must determine the order of curve division, but the above process does not have to do this. Because the distance between the vertexes arrives at a preset minimum value, repeating operation can be terminated, and, although the order is increased, the coordinate of the midpoints does not need to be stored. Therefore, the above process can remove the quality difference between a curve with a large curvature and a curve with a small curvature.

(B) Implementation of Free Curve through other Methods

FIG. 6(B) is a view illustrating a principle of drawing a free curve, which is different from the Bezier curve drawing method. Regarding a triangle with apexes ABC, side AB is divided into n, and side BC is also divided into n. The respective n divided points on side AB are connected to those of side BC in order, thereby obtaining a curve similar to the Bezier curve. That is, the obtained curve is shaped as a spline similar to the Bezier curve, which can be geometrically proven since the curve line passes through the middle points of straight line connected to the midpoints of each side. Here, the middle point refers to the n/2-th point and to a midpoint of a line connecting the n/2-th points on both sides.

A straight line is drawn from the n-th point on the side AB toward the n-th point on the BC and then changes its drawing direction at the point when it meets the n+1-th straight line. As such, when such a process is repeatedly performed, a vector string can be obtained. Such a straight line drawing method can be implemented because the vector pixel according to an exemplary embodiment of the present invention has flexibility.

8. Transformation (Magnification, Reduction, and Rotation) of Curve and Image FIG. 7 is a view illustrating a drawing transform principle by an image processing system according to an exemplary embodiment of the present invention.

As shown in FIG. 7, it is mathematically complicated and difficult to obtain a curve AC from transformation of a wave formed curve AB. Because their sizes are magnified at a ratio of AB:AC, and their relative angle with respect to the vertex A is ∠BAC. However, from the viewpoint of vector, when the curve AB is composed of vector pixels, the summation of the unit vectors of Up, Down, Left, and Right is identical to that of the unit vector of the straight line AB. Similarly, the curve AC and the straight line AC can be also described like that. Therefore, the difference of total summation of vectors between the curves AB and AC is identical to that of total summation of vectors between the straight lines AB and AC, which is similar to the straight line BC.

Therefore, when a sting of the straight line connecting two points B and C is created and then properly distributed and inserted to the curve AB, the curve AC can be obtained. In an exemplary embodiment, to 'properly distribute' means that a string is equally divided in its length to insert the equally divided strings thereto or a string is equally divided according to its horizontal or vertical position to inset them thereto. Such transformation can be applied to an image as well as a drawing.

Figure 8:
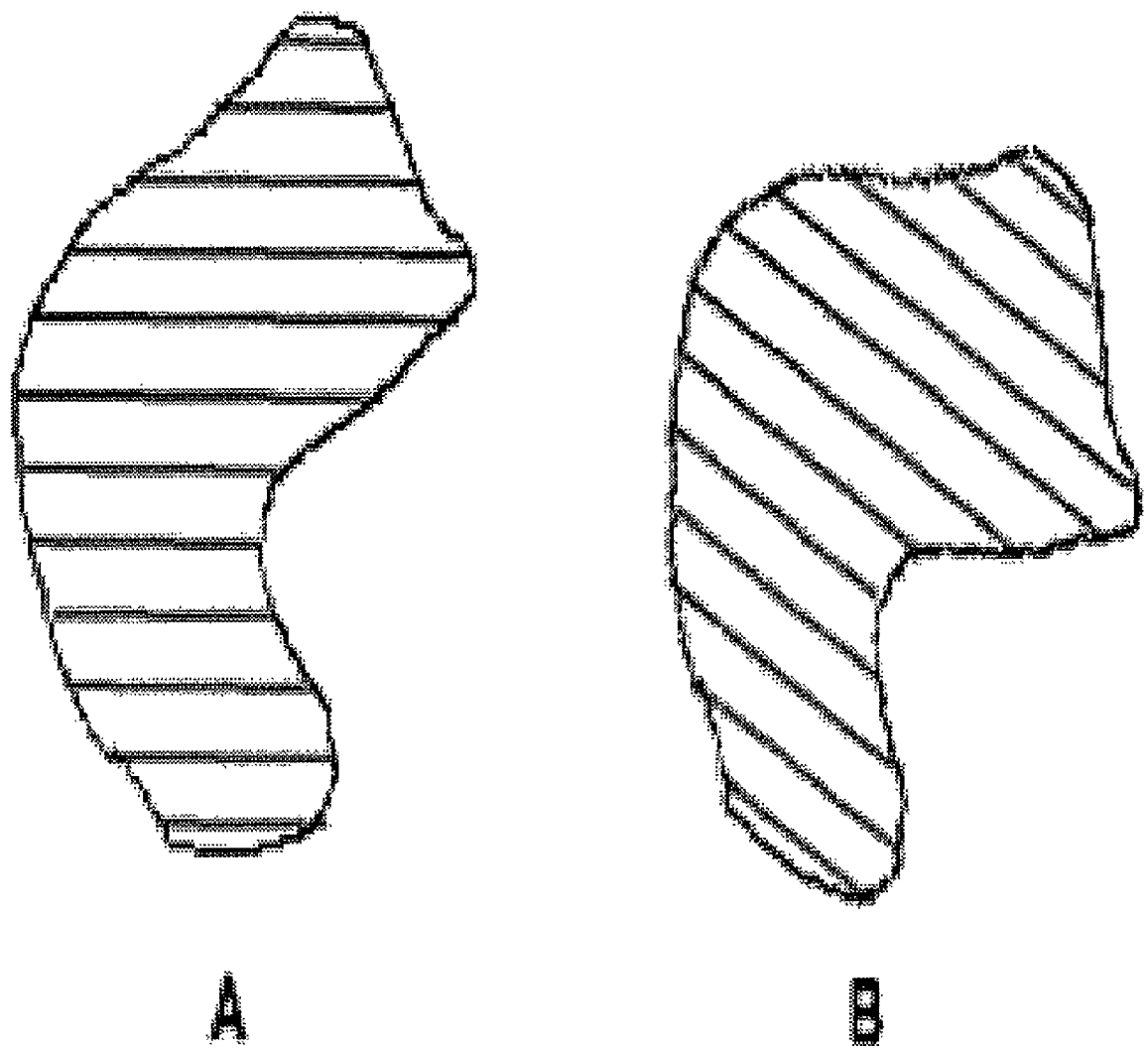
FIG. 8 is a view illustrating an image transform principle by an image processing system according to an exemplary embodiment of the present invention.

FIG. 8 is a view illustrating an image transform principle by an image processing system according to an exemplary embodiment of the present invention.

As shown in FIG. 8A, when vector and color information are arrayed in the direction illustrated by horizontal lines, an image illustrated by an outline is created. On the other hand, when only vector byte of FIG. 8A is changed without changing the color information, so that the horizontal lines is changed to the slant lines as shown in FIG. 8B, an image rotated by a corresponding angle can be obtained.

9. Dividing a Large Image into Small Images

Figure 9:
FIG. 9 is an image describing division image expression by an image processing system according to an exemplary embodiment of the present invention.

FIG. 9 is an image describing division image expression where an image is divided into three parts, A, B, and C.

An image file by a structure of the vector pixel 10 according to an exemplary embodiment of the present invention does not define any specific format but defines a new position, and a new ID, as well as a new format for any of the data. Therefore, several images can be successively mixed. Also, three parts of A, B, and C can be formed into an image with different formats, assigned different IDs thereto, and then mixed.

In particular, since the part C forms a rectangle image, it can be stored as a file or a partial image after a header type is set or a bitmap identifier is assigned to the control. When the RETURN command is affixed to the end of the partial image, it can become an independent image. To efficiently array the total image, a set of CALL commands calling all the partial images is arrayed at the starting part of the file. And there may be a plurality of methods to efficiently array the total image.

The partial image may be processed in such a way that: plane parts can be divided, the same level layers can be displayed, channels can be displayed based on colors, and moving image frame can be displayed. Also, Z-index (indication priority) as a control character is assigned to the partial image, thereby dividing into background and surface images.

10. Implementation of 3-Dimensional Image

Figure 10:
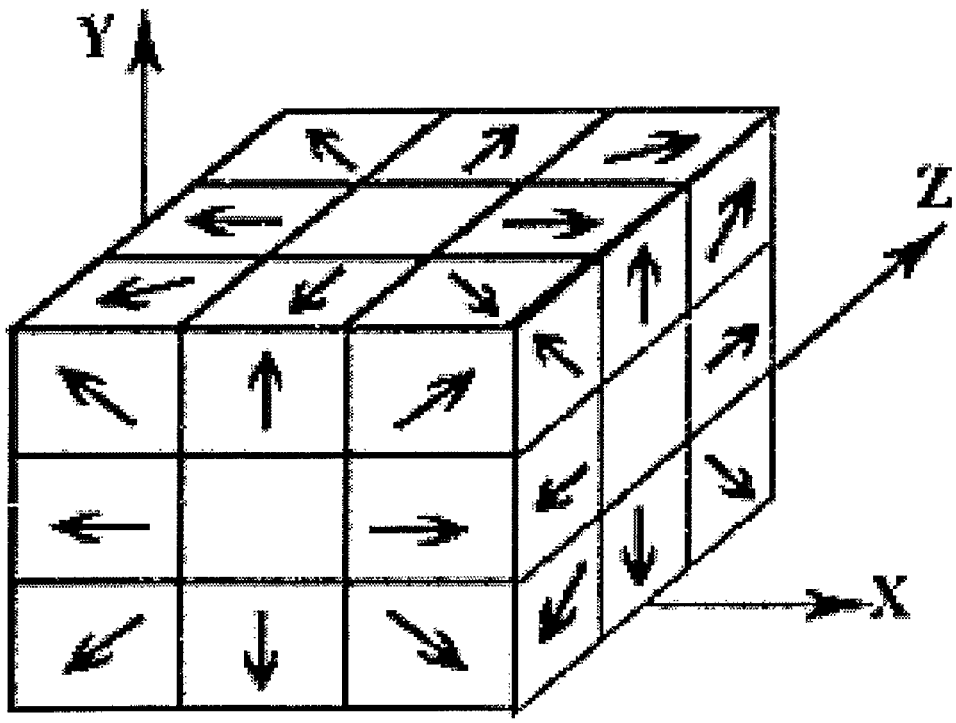
FIG. 10 is a view describing types of vector, when implementing a 3-dimensional image, by an image processing system according to an exemplary embodiment of the present invention.

FIG. 10 is a view describing a theoretical method for implementing a 3-dimensional image by an image processing system according to an exemplary embodiment of the present invention.

As shown in FIG. 10, three-dimensional coordinate can be expressed, in a state where low 4 bits of a vector pixel 10, i.e., vector information portion 11, is regarded as X- and Y-axis, and two bits of high 4 bits of the vector pixel 10 is regarded as Z-axis, and when front and back direction components are added. As shown in FIG. 10, the number of direction vector is not 8 but 26.

0xf0 of the control character 21 enables high 4 bits to be set, and thus 2 bits of Z-axis vector are all set, which means that both opposite direction vectors are simultaneously set. In that case, it does not have the meaning of a vector. That is, the 3-dimensional image can use such a control character 21.

In order to display a 3-dimensional image on a monitor, each point must be transformed into 2-dimensional coordinate. According to an observer's view angle, default 6 types of vector (Up, Down, Left, Right, Front, and Back) of 26 types of vectors must be transformed based on a proportional calculation method, preferably, a Bresenham' proportional calculation. In the conventional method, since coordinate has an absolute value, it must be transformed by multiplication and division. However, since vector data indicate increment, a determination whether a corresponding increment is reflected thereto or ignored can lead to a satisfactory transformation. For example, when ⅙ must be subtracted form X-coordinate, X/6 must be calculated if the coordinate is an absolute value. On the other hand, if the coordinate is a vector, it ignores an increment until Right (→) appears 5 times, and then reflects it thereto at the 6-th Right (→).

The 3-dimensional image processing method: allows the front and rear views of the drawing to be integrated; allows part drawing and part assembling drawing to be integrated;

and allows drawing and projection drawing to be integrated. When an inherent number, as a control, is assigned to each part, only a partial drawing can be printed out or all of the drawings can be integrally printed out. According to an exemplary image processing method, interference of adjacent parts can be easily detected while the assembling drawings are drawn, thereby easily performing a design for the part. Therefore, the image processing method can be applied to the fields of industrial design or curve analysis of NC machine as well as the image field.

11. Edit using Vector Synthesis of High/Low Bit

Independent unit vector is arrayed in the bits, as a buffer, for control command information of the control portion 20. When an image shows a motion as the high vector and low vector are mixed with each other, an edit effect can be achieved. For example, when the lower vectors are "Up Up Up Up (hereinafter referred to as UUUU)," they refer to lines composed of 4 pixels vertically rising. When vectors of "Right Right Right Right (hereinafter referred to as RRRR)" are added to the high bits of corresponding byte of the lower vector, the result becomes "RURURURU" which are described by strait lines declined to right-up by 45°. The header type format defined as "dependently moving of high vector" is to describe the above case.

To this end, it is assumed that a pointer movement function for moving a current position must be properly created. When an additional vector for offsetting the original data appears, the pointer is positioned in place. When components like the original data are added thereto, it is moved by two pixels. When no motion exists, the next data is read. When it is moved by two pixels, coordinates are returned two times.

Although such a process is the same the principle as transformation (magnification, reduction, and rotation) of curve and image as described in item 6, their implanted cases are different from each other. FIG. 6 shows that the original image is transformed. On the contrary, the process in item 11 shows that the original image is not transformed but is mixed with an independent vector indicated in the high vector to change an image when drawing is performed on the display. On the other hand, the edit effect may be achieved as an image is combined with an external string completely independent, although it is not described in detail. In this case, their respective uses and features are different from each other.

(1) For a case where the original image is changed (refer to item 6), the edit result is processed by a curve smoothening process, thereby enhancing image quality.

(2) For a case where the high vector is combined, a plurality of transformations is needed for one original image.

(3) It is used to show different forms according to situations of the original image, which cannot be changed and with which an independent external vector cannot combine.

The above three cases are commonly effective in a drawing or image. The process can be used in such a way that an original form of a single leaf or a single hair can be varied to a certain transformed form. Also, the process can be adapted to an on-line game field where a large amount of information must be processed.

12. Programming of Image

The foregoing description has indirectly described that, after an inherent number is assigned to an image and a calling command is allocated to a control, the current image can be drawn repeatedly, a certain number of times, by loading another image. Additionally, there is a calling condition in the first byte of the parameter (the remaining byte of 4 byte block except for a command character) of the control character CALLGRIM. A calling is determined as the calling condition and the calling switch byte within mode are operated by AND at the time point of calling. The key of the programming determines what kind of switch is prepared, how to turn off, and when the turn-off is performed.

When the RETURN command is performed after one image is called and then executed (for example, an image is displayed on a display or a moving image is performed), a switch of the next associated same level image is turned on or off, thereby continuing a certain motion. For example, when a parameter for turning on a switch of a shield image is inserted at the end of the moving image where a sword is brandished, two images are successively displayed.

With defining a type of a header level or a type of file in a mode, when a type, such as "an image following a curve," is prepared, an image moving by a vector of a curve string provided from the outside can be created. This can be achieved as the Pini of the header is connected to a current position of the curve string. Of course, a default time for movement of 1 point must be set.

The types of images are as follows: ROUTE enabling movement according to other image, REGION forming divisions on a display, PATH forming the divisions, ANIMATION performing animating, LIBRARY collecting pieces of image for calling, and DUMMYGRIM container of calling commands only, etc.

13. Dual Picture Drawing using Vector of High/Low Bit

The foregoing description has described many cases how to use the high 4 bits of the vector pixel 10 of 1 byte unit. The most typical use of the high 4 bits is utilized as an additional vector like the low vector. In other words, two points are expressed using 1 byte. For example, a drawing reduces its required memory size by half, precisely. Therefore, the process can be applied to fields that require a fixed and small memory size for definitions, such as font definition.

Since an image must doubly manage color information, the above process is not adapted to indicate only two pixels for the image. Rather the above process is suitable to express an image, by adding a partial image with a single color, such as an arrow, or symbol, etc. When the low vector is regarded as an original image, the above process can be used to include additional information without losing the original image.

A dual image can be implemented as high/low bits are independently moved, even in a case to generate a certain form while two straight lines or curves are moved according to a left-right symmetry form or a certain rule. Also, the above process can be applied to a case to change color of a space between two points based on a certain rule and to fill the color therein.

14. Possibility of Character Synthesis

The image processing system according to an exemplary embodiment of the present invention provides several functions to insert characters in image information. Of course, the image processing system can draw a character shape in the image information using the high vector as it draws an arrow. In this case, however, the character shape is close to an image rather than a character. That is, character information can be inserted thereto by a control character.

There are three types of control character 21 for inserting characters, which are a command of 2 bytes, a command of 3 bytes, and a command of variable length. The 2 byte and 3 byte commands are created as character information with a corresponding length is affixed to the end of the control character.

The following is a description of the command with a variable length. 0xff is a special control character and is recognized as string information until the following 0xff appears. A character immediately after 0xff as a type of control is not defined in the header or additionally set mode, it is recognized as string information. Since the string data does not have values less than 32 therein, it does not cause confliction with data system of the present invention.

In a state where default font size is set by the control character 21 of file level (the control character was not described, in detail, through a specific example), character size can be adjusted through high and low vectors according to one point increment/decrement. Since a position in which a character is printed will have been managed by a coordinate vector before 0xff appears, direction vector is not needed in the string. Therefore, the vector can be used for font size management. Of course, the high vector cannot be used because it conflicts with string data.

After the first byte after 0xff is set in such a way to be used as the control character 21, when a definition is performed to control necessary factors, such as font type, font size, and character color, etc., finely managed string information can be stored.

15. Time Series Edit of Moving Image using Control Bit

A CALLGRIM switch bit value of mode is automatically varied with the lapse of time of a watch in the "Automata" program. Brightness change of a moving image with the lapse of one day, and a shadow change according to a change in direction of the sunlight can be automatically performed. Also, seasonal changes and wind direction changes of an image according to a change of the control bit, can be automated.

For example, where there are two (or more) relatively bright and dark images for calling, the image brightness is adjusted in such a way that, the switch of the bright image is ON and the switch of the dark image is OFF with the lapse of time, or vice versa. Of course, image brightness can be finely adjusted in such a way that the types of images are additionally prepared as described in item 10 and a built-in brightness adjustment application program is applied thereto.

Although the foregoing description has disclosed and illustrated the configuration and operation of the image processing system using vector pixel, those skilled in the art will appreciate that various modifications, additions and substitutions are possible, without departing from the scope and spirit of the invention as disclosed in the accompanying claims.

As apparent from the above description, the image processing system according to exemplary embodiments of the present invention has the following effects:

1) since it can reduce the size of image data to be stored in a computer's storage memory, such as the main memory or a storage disk, image processing speed can be enhanced and data communication time can be shortened;

2) it can remarkably reduce the amount of work required to produce image data or moving images with development of program tools, such as the Automata program, etc. in the animation and on-line game fields where a large amount of image information is processed and created;

3) as using 3-dimensional drawing, synthetic CAD application programs that do not additionally require an assembling drawing and a part drawing can be implemented in the industrial fields; and 4) it can be applied to the montage field where an image is edited in its local areas and to the mapping field where an image is magnified/reduced, and lines, outlines, and text information, etc., are mixed with each other.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image processing system comprising:
    a vector pixel with 1 byte, in the low 4 bits of which a vector information portion is positioned, and information of one of 8 vectors, up, down, left, right, up-left, up-right, bottom-left, and bottom-right vectors, with respect to X- and Y-axis, is stored;
    a data unit structure forming a partial image by combining the vector pixel, having a boundary indicator for indicating the boundary of the partial image at the end of the data unit structure;
    a data portion forming a complete image by combining the data unit, having a terminator for indicating the termination of the complete image at the end of the data portion;
    a file generation unit for forming the data portion according to a specific command, and generating/storing a computer image file based on the data portion; and
    a data processing unit for processing direction indications according to vector information of the image file generated by the file generation unit and for forming an image based on the direction indication process.

2. The system according to claim 1, wherein the vector pixel of 1 byte is configured to store vector information of the front and back direction with respect to the Z-axis in the two bits of the high 4 bits.

3. The system according to claim 1, wherein the vector pixel of 1 byte is configured to store vector information identical to that of the vector information portion in the high 4 bits.

4. The system according to claim 1, wherein the vector pixel further comprises color information portion of 3 bytes for red (R), green (G), and blue (B) color values, in which the 4 bytes of the vector pixel refers to an extended vector pixel.

5. The system according to claim 1, further comprising a control portion composed of a control character, which stores control command information, and a control parameter that processes a command for the control character, wherein the control portion is composed of at least 4 bytes in which the vector pixel is combined in the data unit structure, as one of coordinate value, addition vector information, or color information is stored in a control command format to assist in a function of the vector pixel.

6. The system according to claim 5, wherein the control character comprises:
   a control character indicator having a certain value, for indicating the control character; and
   a control character identifier for identifying types of controls.

7. The system according to claim 5, wherein the control portion is configured in such a way that:
   the control character is composed of 1 byte to store 16 commands in the control character identifier; and
   the control parameter is composed of 3 bytes to process the commands of the control character.

8. The system according to claim 5, wherein the control portion is configured in such a way that:
   the control character is composed of 2 bytes to store 255 commands in the control character identifier; and
   the control parameter is composed of 2 bytes to process the commands in the control character.

9. The system according to claim 1, further comprising a header at the front of the data portion,
   wherein the header stores one of a starting point, coordinate value, additional vector information, or color information to assist in a function of the data portion or to declare a command process.

* * * * *